Patented Jan. 15, 1929.

1,698,900

UNITED STATES PATENT OFFICE.

KARL WILKE, OF HOCHST-ON-THE-MAIN, GERMANY, ASSIGNOR TO GRASSELLI DYE-STUFF CORPORATION, OF NEW YORK, N. Y., A CORPORATION OF DELAWARE.

PROCESS OF PREPARING α-AMINOANTHRAQUINONE-β-CARBOXYLIC ACIDS.

No Drawing. Application filed March 3, 1927, Serial No. 172,556, and in Germany March 8, 1926.

My present invention relates to the preparation of ortho-amino-carboxylic acids of the anthraquinone series and substitution products thereof.

I have found that by treating with a saponifying agent as for instance a diluted alkali, lime or the like, the reaction products which are obtained for instance by the action of fuming sulfuric acid upon α-nitro-β-methylanthraquinones at a low temperature, the said reaction products are transformed by an easy reaction with a good yield and without any formation of considerable quantities of by-products into the α-amino-β-anthraquinone-carboxylic acids which are valuable starting materials for the preparation of dyestuffs.

The following examples serve to illustrate my invention, but they are not intended to limit it thereto; the parts are by weight:

1. The anthraquinone-1.2-isoxazole, which is produced for instance by the action of fuming sulfuric acid upon 1-nitro-2-methylanthraquinone and is insoluble in cold alkalies, is introduced into an excess of dilute caustic alkali solution or sodium carbonate solution, and heated, while stirring, to about 80–90° C. until the mass is dissolved to a red solution. From the filtered solution there is obtained by precipitation with a dilute mineral acid the 1-aminoanthraquinone-2-carboxylic acid of known properties. The reaction takes place in the following manner:

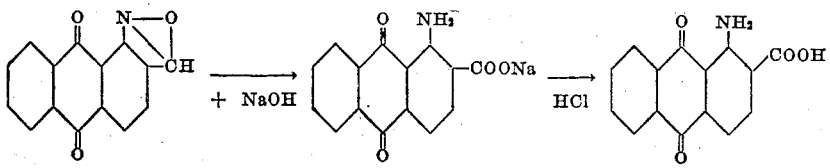

2. A paste of the yellow anthroquinone-1.2-isoxazole (cf. U. S. patent specification No. 1,417,875, Example 1) is mixed with an excess of diluted milk of lime and heated to boiling, until a suspension of the red calcium salt of the 1-amino-anthraquinone-2-carboxylic acid has formed in the reddish mother-liquor. This suspension is then acidified by adding dilute hydrochloric acid. After having heated the suspension for a short time in order to decompose the calcium salt, the amino-carboxylic acid which separates is filtered, washed and dried.

3. From the 5-nitroanthraquinone-1.2-isoxazole which is produced for instance by causing fuming sulfuric acid to act upon 1.5-dinitro-2-methylanthraquinone, there is prepared the 1-amino-5-nitro-2-anthraquinone-carboxylic acid exactly according to the directions given in Example 1. The action may be represented by the equation:

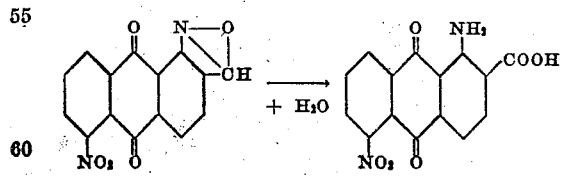

The properties of this acid are similar to those of the non-nitrated 1-amino-anthraquinone-2-carboxylic acid. Its alkali salts give deep red solutions from which after addition of an acid the aminonitro-carboxylic acid is precipitated in the form of red flakes melting at 325° C. The said acid is insoluble in water, very difficultly soluble in the usual low-boiling organic solvents, somewhat more readily soluble in hot nitrobenzene to a yellowish-red solution. The yellowish-brown color of its solution in concentrated sulfuric acid turns deep blue immediately on addition of formaldehyde.

4. The anthraquinone-1.2.5.6-diisoxazole which is produced for instance by the action of fuming sulfuric acid upon 1.5-dinitro-2.6-dimethylanthraquinone and which forms a brownish-yellow powder soluble in concentrated sulfuric acid to a brownish-yellow solution, yields, when suspended in an excess of dilute caustic alkali solution and heated on the water bath (more slowly in sodium carbonate solution) an intense violet-red solution, from which, on addition of a dilute mineral acid, the 1.5-diaminoanthraquinone-2.6-dicarboxylic acid is precipitated in the form of red flakes. It is very difficultly soluble even in high-boiling solvents. The color of its solution in concentrated sulfuric acid is brownish-yellow and turns blue on addition of formaldehyde. The new acid has the formula:

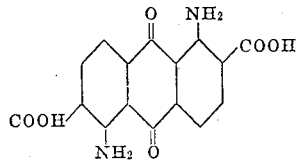

5. In the same manner can be prepared the 1.8-diamino-anthraquinone-2.7-dicarboxylic acid by treating, as above described, anthraquinone-1.2.8.7-diisoxazole by heating on the water-bath with a dilute aqueous alkali solution. It has similar properties as the isomeric diaminodicarboxylic acid described in example 4 from which it differs only by the more bluish color both of its powder and of the solutions of its alkali salts. It has the following formula:

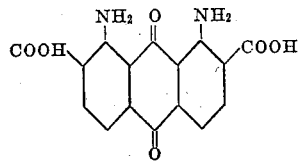

The anthraquinone-1.2.8.7-diisoxazole above referred to can be obtained by causing fuming sulfuric acid to act upon 1.8-dinitro-2.7-dimethylanthraquinone. It constitutes an olive-brown powder soluble in concentrated sulfuric acid to a brownish-yellow solution.

I claim:

1. A process of making α-amino-anthraquinone-β-carboxylic acids which comprises subjecting an anthraquinone-α.β-isoxazole compound of the series including anthraquinone-1.2-isoxazole, anthraquinone-1.2.5.6-diisoxazole, anthraquinone-1.2.8.7-diisoxazole and their substitution products, to the action of a saponifying agent.

2. A process of making 1-amino-anthraquinone-2-carboxylic acid of the formula:

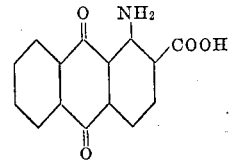

which comprises subjecting anthraquinone-1.2-isoxazole to the action of a saponifying agent.

In testimony whereof, I affix my signature.

KARL WILKE.